United States Patent [19]
Delpretti

[11] Patent Number: 5,475,195
[45] Date of Patent: Dec. 12, 1995

[54] ANTI-CORROSION DEVICE FOR ELECTRICAL DISCHARGE MACHINING

[75] Inventor: Roger Delpretti, Vernier, Switzerland

[73] Assignee: Charmilles Technologies SA, Switzerland

[21] Appl. No.: 958,325

[22] PCT Filed: Feb. 11, 1992

[86] PCT No.: PCT/CH92/00027

§ 371 Date: Sep. 7, 1993

§ 102(e) Date: Sep. 7, 1993

[87] PCT Pub. No.: WO92/14575

PCT Pub. Date: Sep. 3, 1992

[30] Foreign Application Priority Data

Feb. 18, 1991 [CH] Switzerland ................... 494/91

[51] Int. Cl.⁶ .................. B23H 1/02; B23H 7/04
[52] U.S. Cl. .................. 219/69.12; 219/69.13; 219/69.18
[58] Field of Search .................. 219/69.12, 69.13, 219/69.17, 69.18

[56] References Cited

U.S. PATENT DOCUMENTS

| | | | |
|---|---|---|---|
| 4,678,884 | 7/1987 | Obara et al. | 219/69.13 |
| 4,975,557 | 12/1990 | Yamada et al. | 219/69.12 |
| 5,171,956 | 12/1992 | Haruki et al. | 219/69.12 |

FOREIGN PATENT DOCUMENTS

| | | | |
|---|---|---|---|
| 61-284320 | 12/1986 | Japan | 219/69.12 |
| 63-288623 | 11/1988 | Japan | 219/69.12 |
| 2-76627 | 3/1990 | Japan | 219/69.12 |
| 3-136719 | 6/1991 | Japan . | |
| 637224 | 12/1978 | U.S.S.R. | 219/69.12 |

*Primary Examiner*—Geoffrey S. Evans
*Attorney, Agent, or Firm*—Gifford, Krass, Groh, Sprinkle, Patmore, Anderson & Citkowski

[57] ABSTRACT

Electrical discharge machining of a positively charged workpiece with a negatively charged wire electrode (2) by a pulse generator (3), with water as the dielectric fluid, generates a stray current known as "leakage current" that leads to a form of corrosion on the surface of the workpiece known as "anodic dissolution". A secondary circuit fed by a generator (5) and located between the workpiece and auxiliary electrodes (6), creates an equalizing current that cancels the leakage current and diminishes or eliminates anodic dissolution of the workpiece (1). The auxiliary electrodes (6) can be mounted on machining heads (7) with a non-conductive material (8) between the auxiliary electrodes.

8 Claims, 2 Drawing Sheets

ANTI-CORROSION DEVICE FOR ELECTRICAL DISCHARGE MACHINING

The present invention relates to the machining of metallic workpieces by electrical discharge machining, in particular with a wire cut machine, and concerns a device to protect the workpiece against secondary corrosion and parasitic phenomena due to the electrical-discharge machining process itself.

During the electrical-discharge machining process, the machining area between the workpiece-electrode and the tool-electrode, in which the erosive sparks appear, is submerged or sprayed with a dielectric liquid which is most frequently water.

Water (or a liquid of comparable electrical conductivity), even when deionized, is always somewhat conductive (on the order of several microsiemens/cm to several dozens of microsiemens/cm; one siemen= 1/ohm). Thus, when the machining liquid is water (or a comparable liquid) and the tool-electrode has negative polarity (cathode) and the workpiece is positive (anode), an eddy or parasitic current, called a "leakage (or vanishing or drain) current", can be observed which circulates from the workpiece to the tool-electrode and is caused by the potential difference between these two electrodes. This phenomenon is especially noticeable during the so-called off time, the period prior to the spark discharge, when the voltage between the electrodes can be between 80 and 200 volts, depending on the machining settings and the generator employed. This creates a displacement of material and, therefore, corrosion of the workpiece, a phenomenon referred to as anodic dissolution. Moreover, this change in the workpiece geometry is accompanied by a change in its surface quality and a weakening of its mechanical properties.

This phenomenon is illustrated in FIG. 1, where the tool-electrode is a wire-electrode 2 connected to the negative pole of an electric pulses generator 3. The workpiece-electrode 1 is connected to the positive pole of the generator 3 and functions therefore as an anode. FIGS. 2 and 3 illustrate general principles of electrical discharge machining. Here the variation over time of the potential difference V set up in the gap between the electrodes, and the electric current I, circulating through this gap are represented. With every pulse emitted by the generator 3, the voltage V rises to Va, forming a plateau during the waiting delay time, and decreases thereafter to an average value Ve, which fluctuates slightly. This drop corresponds to the discharge of a spark 4 between the tool-electrode and the workpiece. The voltage V then decreases to a nil value, Vr, during an off time.

The current Ie corresponds to the discharge phase, i.e. to the passage of the spark 4 between the tool-electrode and the workpiece, and current Ir to the off time. Owing to the low conductivity of the dielectric fluid steeping the space between the electrodes, an eddy current Ia, called "leakage current", circulates between the electrodes. It is this leakage current Ia which is liable for the anodic dissolution. At the area near the surface of the workpiece which are the most affected by the eddy current Ia, metal atoms are ionized, resulting in the release of positive ions and of free electrons, as represented by the following formula:

These positive ions, along with the inversely freed electrons, maintain the eddy current Ia in the water or comparable dielectric fluid circulating in the machining area. Because machining time often requires several hours, or even days, and workpieces are most often steel, this corrosion quickly becomes unacceptable, for it destroys the accuracy of previously machined areas before they are even attached to the electrical discharge machine (reference surfaces, ground faces, etc.). In addition to this change in the geometry of the machined workpiece, its surface is altered and its mechanical strength weakened. The surface finish of the corroded workpiece is often incompatible with the desired finish quality. This parasitic (leakage) current dissolves not only the workpiece but all unprotected and electrically conductive machine parts subject to the action of the dielectric fluid. These include any supports, clamps, current feeds, etc. Careful measurement and subsequent rectifying operations may, therefore, be required.

Ever since the beginning of electrical discharge machining, manufacturers and end users have tried to eliminate or, at least, diminish the effects of that anodic dissolution. It has been suggested that a spark generator that delivers nil average voltage be used. This was done by applying the waiting delay voltage Va that causes the anodic dissolution for a very brief period prior to the discharge, and equalizing it immediately thereafter with a voltage of opposite polarity. Although the effects of corrosion are thereby significantly reduced, this type of generator does not allow increased machining speed by using a low cost generator. It has also been suggested that an anticorrosion liquid be added to the dielectric to protect the workpiece. But this solution is expensive and impractical because it is necessary to continuously monitor and adjust the composition of the dielectric mixture. Various coatings, including greases, oils, varnishes, etc., have also been suggested as a way to protect the workpieces. These solutions have not provided satisfactory results, for the protective layer must be uniform and free from defects. This alternative can even increase corrosion significantly in those areas where there is a defect in the protective layer, because the leakage currents concentrate in the areas where defects appear. Regular and evenly distributed anodic dissolution corrosion is considered to be preferable to a localized but significant defect.

The present invention proposes a mechanism for effectively protecting the workpiece against the parasitic phenomenon of anodic dissolution without additional cost.

The characteristics and advantages of the invention are showed in following description and drawings in which:

FIGS. 1 to 3, previously mentioned, illustrate in a general manner the electrical discharge machining process and the parasitic current phenomenon;

The studies on metal corrosion that have been conducted until today, such as the study included in Volume 1 of "Metallurgie by C. Chaussin and G. Hilly, pages 198 to 213 (Editions Dunod)", take only into account those problems connected with natural corrosion from the presence of together non-neutral elements, and suggest essentially passive protective methods that rely on the electrochemical potentials of the different present materials. The present invention, however, suggests the use of an active device that directly counteracts anodic dissolution during electrical discharge machining, and which is simple, inexpensive, and has no detrimental effects on cutting speed.

Figure 4:
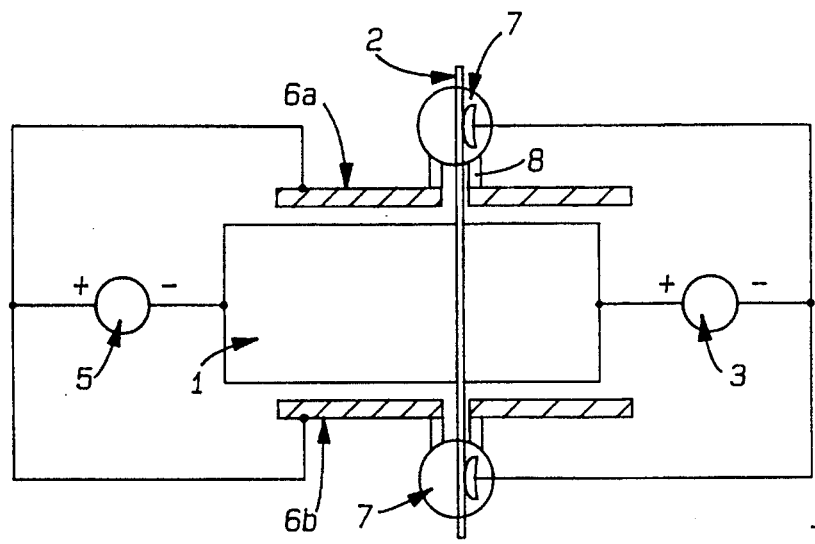
FIG. 4 represents in simplified form a device in accordance with the invention, viewed from the front with a 90° half cross section.

The device as provided in the invention is illustrated schematically in FIG. 4. It consists essentially of grafting a secondary circuit to the conventional erosive discharge circuit, said secondary circuit being able to counteract the parasitic effects caused by the leakage current Ia in the first circuit. It is basically a "cathodic protection" device which counteracts the phenomenon of anodic dissolution. This circuit consists essentially of an auxiliary generator 5 whose negative pole is connected to the workpiece 1, which then becomes the cathode in this secondary circuit. The generator's positive pole 5 is connected to at least one, and preferably two, auxiliary electrodes 6 (and even more than two, depending on the complexity of the workpiece 1.) The operating method illustrated in FIG. 4 shows two auxiliary electrodes 6a and 6b. Said auxiliary electrode(s) is(are) immersed in the dielectric machining fluid or sprayed with it so that the entire machining area is bathed in said fluid. They are arranged around the surfaces of workpiece 1 in such a way as to protect it from anodic dissolution without making contact with said surfaces. The electric field created between the workpiece 1 and the auxiliary electrode(s) 6, which function as anodes, creates a current I'a that counteracts the leakage current Ia and diminishes and can even cancel the effects of anodic dissolution related to actual machining. The resulting anodic dissolution is produced on the electrodes 6. In order to limit actual erosion, it is beneficial to use electrodes made of a material with an inherent resistance to electrochemical corrosion; for example stainless steel, titanium, graphite, or a material covered with a protective coating such as platinum, etc.

The auxiliary generator 5 can produce direct or pulsed current, but, obviously, cannot produce AC current since its polarity must always remain the same.

For wire electrical discharge machining, these electrodes 6a and 6b are preferably mounted on the standard machining heads 7 used to guide the wire electrode 2. They are connected to the heads 7 by intermediate elements 8, which are non-conductive, and adjusted to allow the wire 2 to move freely, which will prevent the electrodes from being parasitically machined along with the workpiece 1. Another variant is possible in which the auxiliary electrodes are mechanically connected to the workpiece 1, with a non-conductive element between them. A disadvantage of this variant is that the auxiliary electrodes are machined along with the workpiece 1. So, although this variant provides ideal protection to the machined workpiece, the necessity of supplying new auxiliary electrodes for each new machining step makes it commercially impractical.

We would also like to point out that the absolute value of the countercurrent I'a must not exceed the leakage current Ia, whose effects are wanted to be minimized. Otherwise, the metal ions freed from anodic dissolution of the auxiliary electrodes will be deposited on the surfaces of the workpiece 1, which we are trying to protect against corrosion, and will affect both surface finish and machining accuracy.

Figure 1:
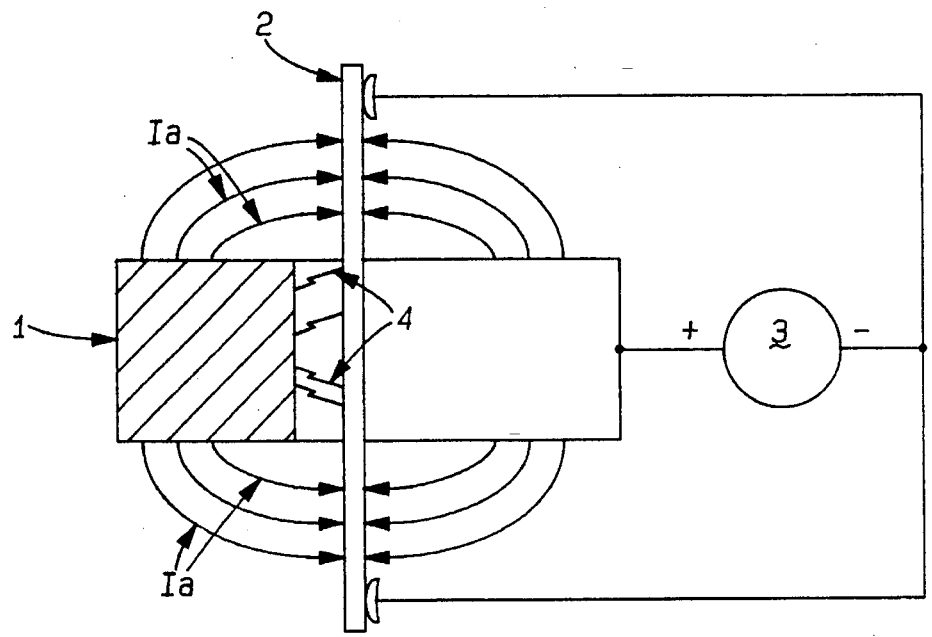
Figure 2:
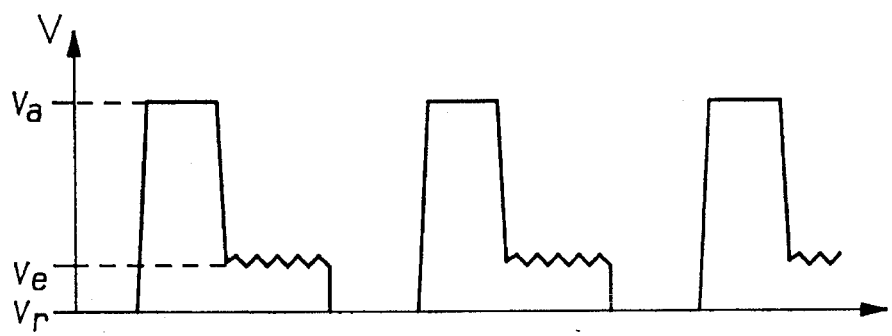
Figure 3:
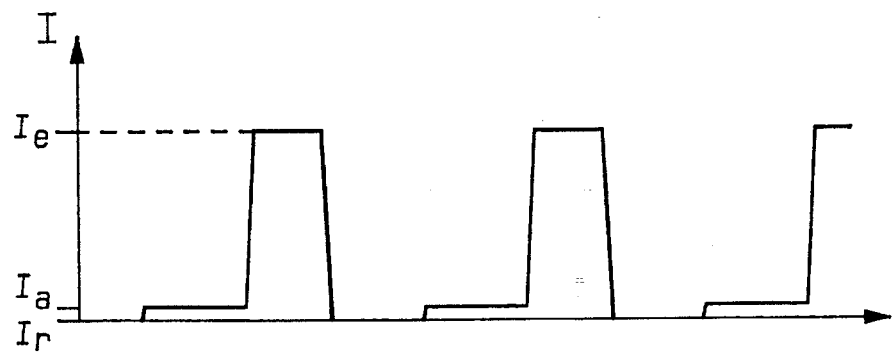
Figure 5:
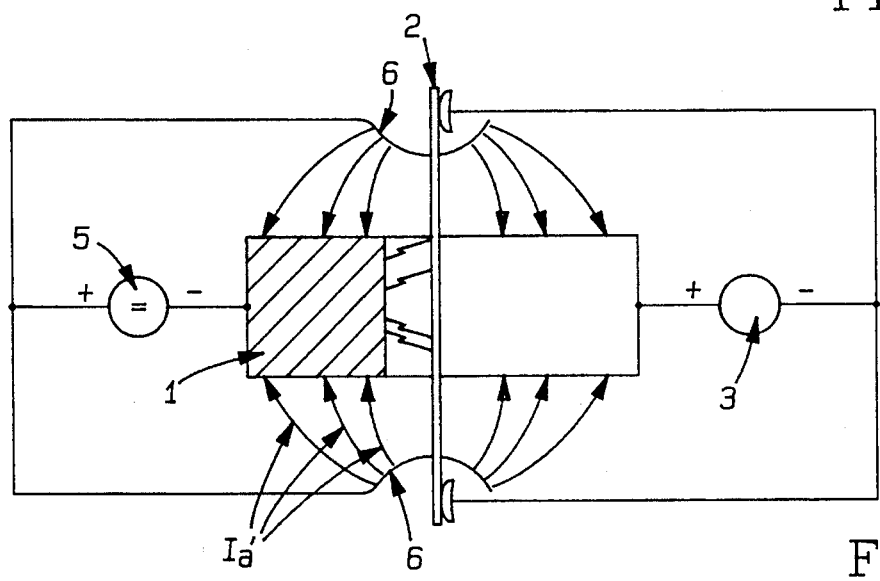
FIG. 5 illustrates one of the preferred embodiments of the device according to the invention, in which an electric countercurrent equalizes the leakage current.

As stated above it is preferable to connect the electrodes 6 of the secondary circuit to the machining heads 7 and to adjust them moreover to the shape of the machining heads 7 and of the workpiece 1 depending on the local current density to equalize. This is illustrated in FIG. 5, which is similar to FIG. 1, and in which the auxiliary electrodes 6 are shown as shields with a convex form turned toward the workpiece 1, and with a hole in their center through which the machining wire 2 can pass.

Figure 6:
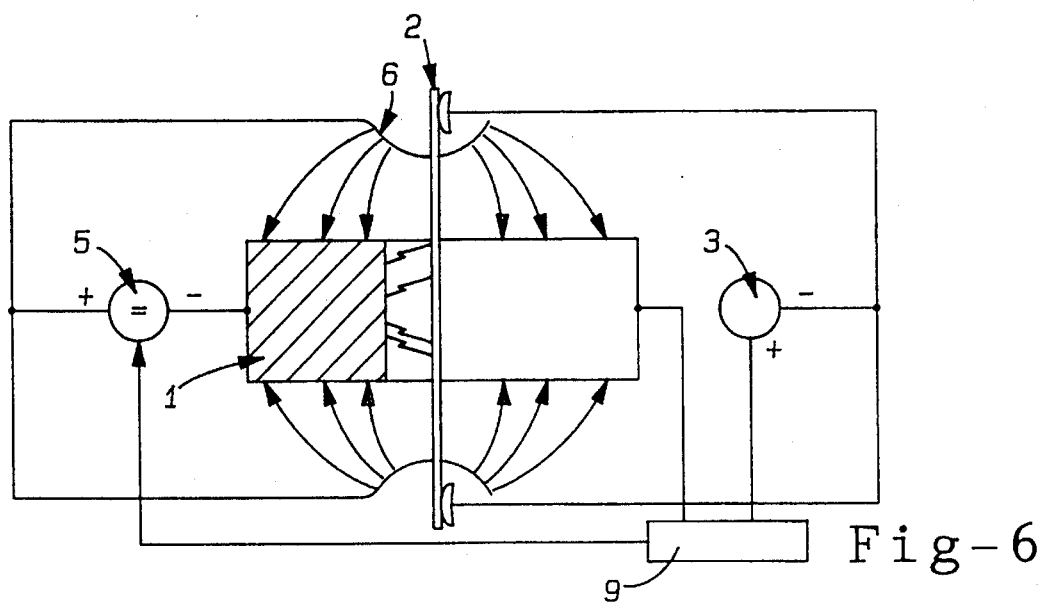
FIG. 6 illustrates another embodiment similar to that showed in FIG. 5, but with the addition of a device for regulating and controlling the equalizing countercurrent intensity.

For optimum equalization it is best to adjust the equalizing current to the leakage current in order to protect the workpiece from corrosion due to anodic dissolution and avoid depositing material from the auxiliary electrodes onto it. A method of avoiding this undesirable migration of material from the auxiliary electrodes toward the workpiece 1 is shown in FIG. 6. It is based on adjusting the equalizing current I'a as a function of the intensity of the leakage circuit Ia. The leakage current Ia can be measured either with an auxiliary device or a device in the principal electrical discharge circuit. It can be measured as shown in FIG. 6, for example, owing to a device 9 that functions during the waiting times between the sparks produced by the generator 3. This device 9 can be an ammeter or a voltmeter. In FIG. 6 it is connected to the positive pole of the generator 3, to the workpiece 1, and to the auxiliary generator 5. It is adjusted to deliver a control signal that monitors operation of the auxiliary generator 5 and, therefore, the intensity of the equalizing current I'a. The leakage current can also be determined from certain factors, such as the conductivity of the dielectric fluid and the workpiece geometry. The equalizing current is then adjusted in accordance with this information.

Without drifting from the context of the present invention, a device according to the present invention could easily be combined with devices currently in use, such as the anti-collision guards similar to those described in Swiss application No. 4 325/88, for example, or the components used to detect the fall of off-cut parts, after any needed adaptation or modifications.

An auxiliary ammeter or voltmeter, for example, could be placed between the auxiliary generator 5 and one of the auxiliary electrodes, preferably horizontal and located beneath the workpiece 1, such as electrode 6b illustrated in FIG. 4. If a part of the workpiece 1 is cut by the electrode-wire in such a way as to be completely separated from the wire, it will fall on the auxiliary electrode (electrode 6b in FIG. 4), creating a short circuit in the auxiliary circuit, which will be indicated by the auxiliary ammeter or voltmeter described above. This component can also be used to determine the intensity of the equalizing current I'a.

The device as provided in the present invention and as described above relates especially to wire electrical discharge machining. But it can also be used with dye sinking electrical discharge machining providing that the causes of anodic dissolution are the same: that is, the workpiece, connected to the positive pole of the pulse generator, functions as the anode, and water (or another dielectric liquid of comparable conductivity) is used as the machining dielectric fluid.

I claim:

1. A machine for electrical-discharge machining of a workpiece by a wire electrode, comprising:

a voltage pulse generator emitting pulses separated by waiting times and having a positive pole connected to the workpiece;

a secondary equalizing circuit for protecting the workpiece against corrosion due to anodic dissolution by diminishing or eliminating said corrosion, said secondary equalizing circuit comprising at least one auxiliary electrode; and an auxiliary generator having a positive pole connected to said at least one auxiliary electrode and having a negative pole connected to the workpiece, said auxiliary generator is adjusted to create, between said at least one auxiliary electrode and the workpiece a current that counteracts a leakage current circulating between the workpiece and the wire electrode during a predetermined time period between pulses emitted by said voltage pulse generator.

2. The machine according to claim 1, further comprising at least two auxiliary electrodes arranged on opposite sides of the workpiece.

3. The machine according to claim 1, said at least one auxiliary electrode being made of a metallic material that resists electrochemical corrosion.

4. The machine according to claim 1, further comprising two machining heads adjusted to guide the electrode wire therebetween, said at least one auxiliary electrode consisting of at least one electrode being mounted to each of said machining heads, a non-conductive element being mounted between each said machining head and said at least one electrode associated with said machining head and adjusted to allow free passage of the electrode wire.

5. The machine according to claim 4, further comprising said at least one electrode being attached to at least one anticollision guard mounted on said machining heads.

6. The machine according to claim 1, further comprising said at least one auxiliary electrode being mechanically connected to the workpiece, a non-conductive element being positioned between said at least one auxiliary electrode and the workpiece.

7. The machine according to claim 1, further comprising said auxiliary generator and said at least one auxiliary electrode being adjusted to measure the leakage current between the workpiece and the wire electrode and to supply said auxiliary generator with a signal that can control its voltage and, therefore, the countercurrent that it generates.

8. The machine according to claim 1, wherein said at least one auxiliary electrode is attached to a device for detecting the fall of off-cut parts.

* * * * *

UNITED STATES PATENT AND TRADEMARK OFFICE
CERTIFICATE OF CORRECTION

PATENT NO. : 5,475,195
DATED : December 12, 1995
INVENTOR(S) : Roger Delpretti

It is certified that error appears in the above-indentified patent and that said Letters Patent is hereby corrected as shown below:

Column 1, line 62, delete "$M \rightarrow M^{n+} = ne^-$", and insert --$M \rightarrow M^{n+} + ne^-$--.

Signed and Sealed this

Seventh Day of May, 1996

Attest:

BRUCE LEHMAN

*Attesting Officer*  *Commissioner of Patents and Trademarks*